May 14, 1968     I. PHETERSON     3,382,901
CABBAGE TRIMMER

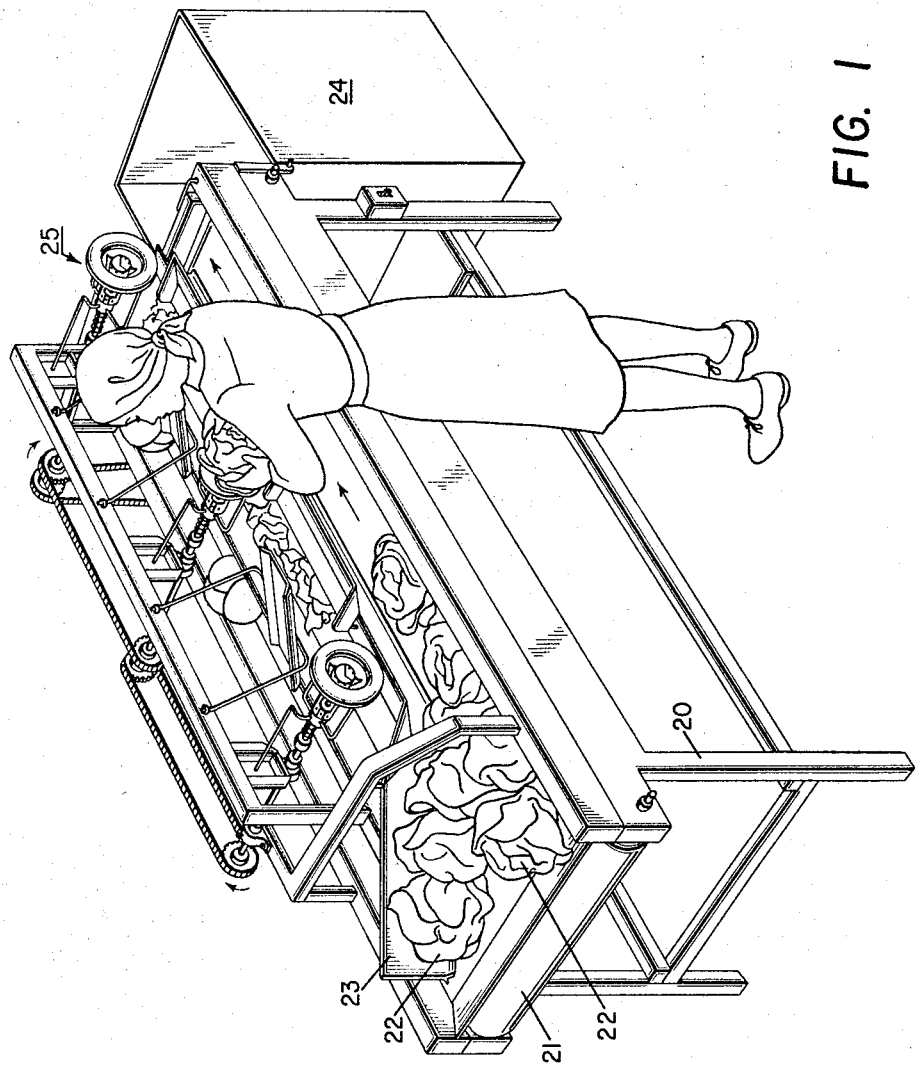

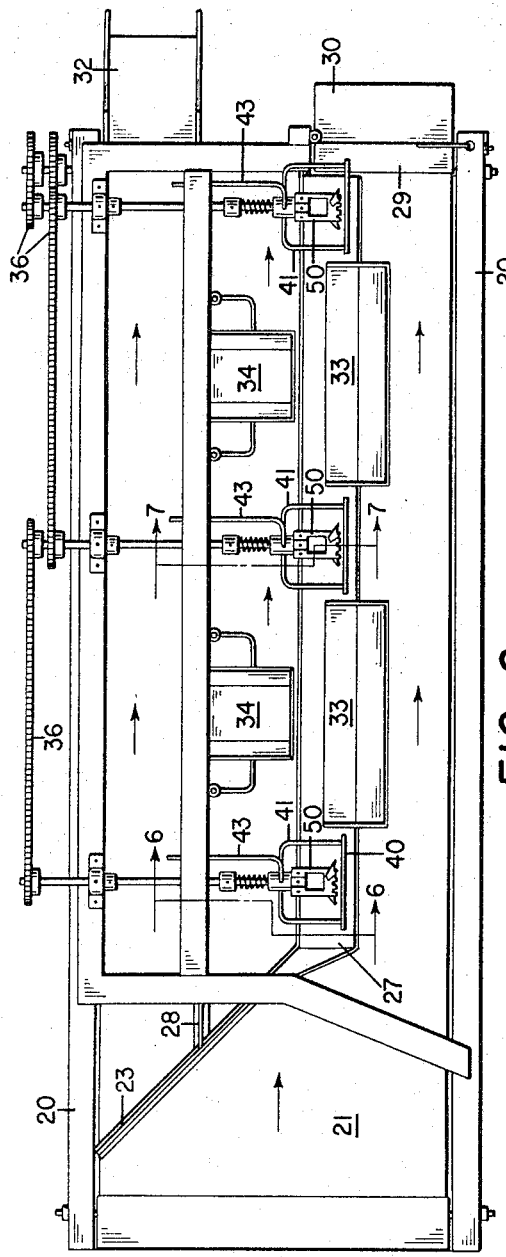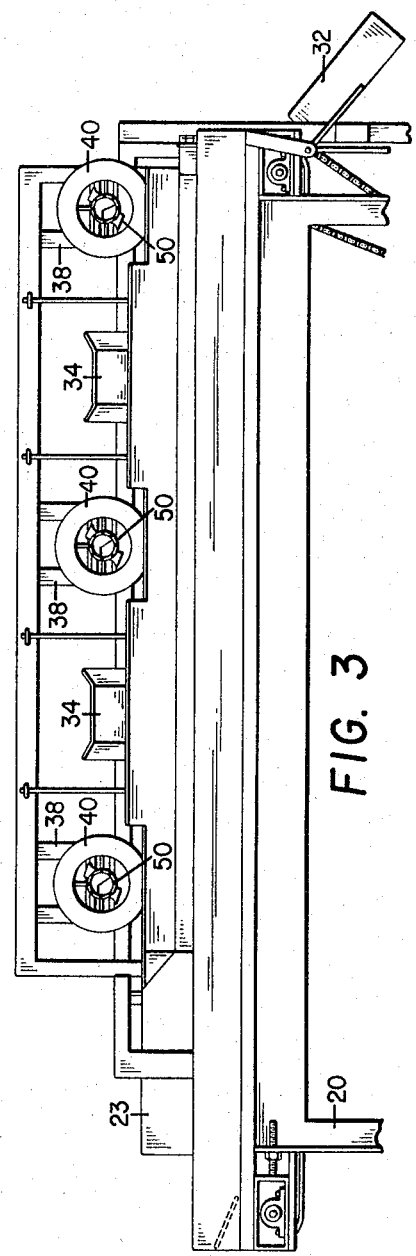
INVENTOR.
IRVING PHETERSON
HIS ATTORNEYS.

Filed June 17, 1966     4 Sheets-Sheet 3

INVENTOR.
IRVING PHETERSON
BY
*Crumpton + Shaw*
HIS ATTORNEYS.

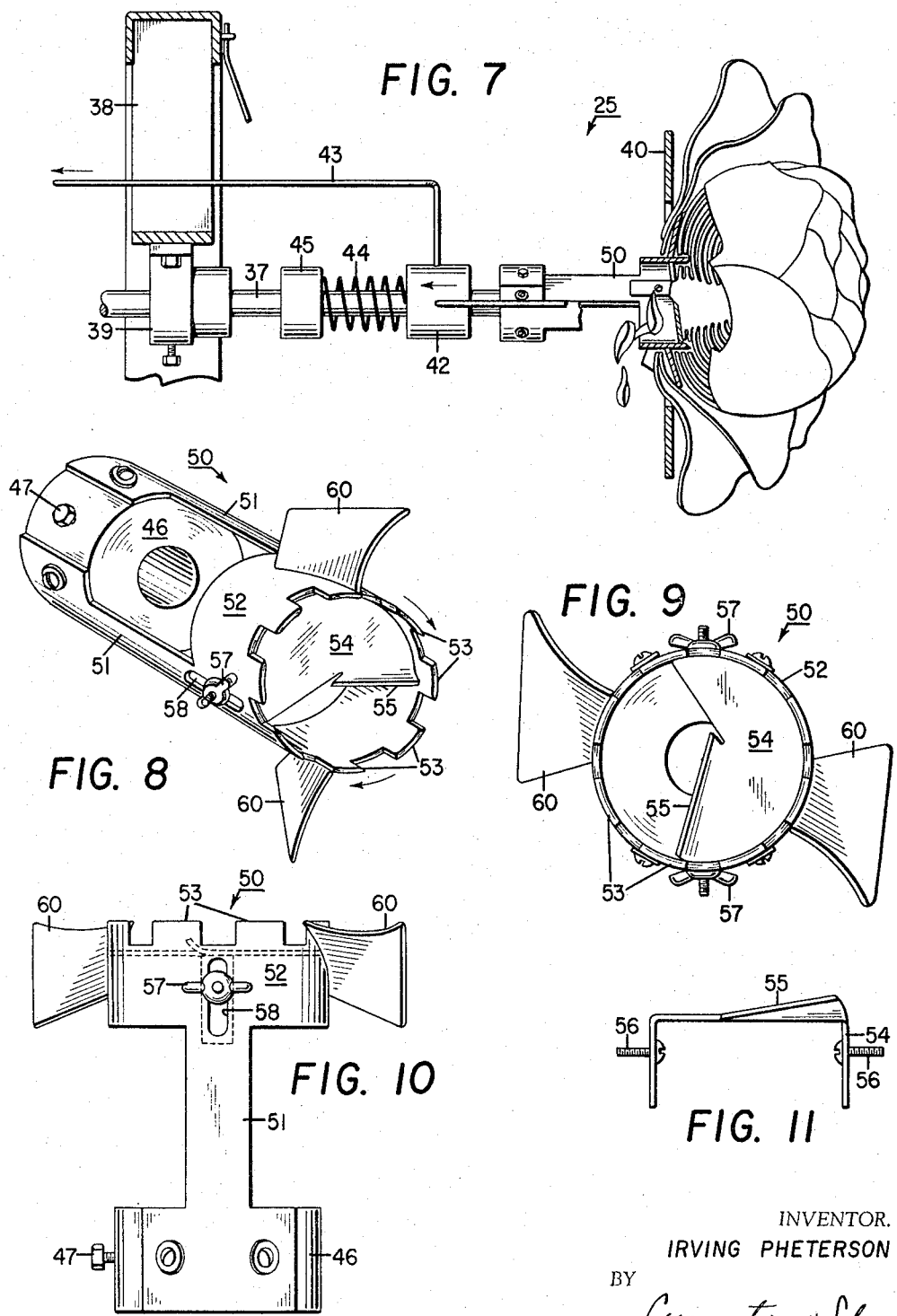

3,382,901
CABBAGE TRIMMER
Irving Pheterson, 16780 Skillington Road,
Holley, N.Y. 14470
Filed June 17, 1966, Ser. No. 558,491
8 Claims. (Cl. 146—52)

ABSTRACT OF THE DISCLOSURE

The machine disclosed herein includes a driven spur for cutting around the core of a cabbage, thereby severing the outer leaves therefrom, a cutter disposed within said spur for cutting away the core and arms disposed radially outwardly from said spur for loosening and removing the leaves severed from the core.

---

Cabbages as harvested from the field normally include coarse outer leaves joined to the core of the cabbage at its base and extending outwardly around the cabbage head. These coarse outer leaves are not formed into the head portion of the cabbage and are generally not eaten. They consume space and detract from the market appearance of the edible head. Accordingly, such coarse outer leaves are generally removed from the edible head before it is marketed.

Presently, such coarse outer leaves are trimmed from cabbage heads with hand manipulated knives. Such a procedure is laborious, slow, wasteful and expensive.

The objects of this invention include, but are not limited to, the following:

(a) Increasing the speed and reducing the cost of trimming coarse outer leaves from cabbages to ready the edible heads for market;

(b) Increasing the production rate for each person working at trimming cabbage heads for market;

(c) Reducing waste in cabbage head trimming by removing a minimum number of unwanted, coarse outer leaves from the edible head;

(d) Improving the appearance of cabbage heads trimmed for market, and making such appearance more uniform; and (e) Reducing damage to the edible head of cabbage during trimming of the head for market.

These and other objects of the invention will be apparent hereinafter from the specification which describes the invention, its use, operation, and a preferred embodiment, from the drawings, which constitute a part of the disclosure, and from the subject matter claimed.

Generally, the inventive cabbage trimmer comprises a cutting spur driven to cut a circular path around the core of a cabbage the core-end of which is pressed against the cutter. Such spur severs the coarse outer leaves from the cabbage core at its base. Preferably, a knife is mounted to rotate within the circular path of the spur to cut away the cabbage core so that it is nearly flush with the head after trimming. Also, the inventive trimmer preferably includes an arm extending radially outward beyond the spur for loosening and removing the leaves severed from the core. A movable guard is preferably disposed to protect the operator from the power driven cutter, but to expose a cabbage to the cutting head when desired.

Also, conveyor means are preferably arranged for bringing untrimmed cabbage heads to the cutter and carrying trimmed heads and waste away from the cutter.

In the drawings:

FIG. 1 shows a perspective view of a preferred embodiment of the inventive machine;

FIG. 2 is a plan view of the machine of FIG. 1;

FIG. 3 is a side elevation of the machine of FIG. 1;

FIG. 7 is a partially cut-away side elevation of the inventive cutting head taken along the line 7—7 of FIG. 2 and showing the cutter in operation on a cabbage head;

FIG. 8 shows a perspective view of the inventive cutter;

FIG. 9 is a plan view of the cutter of FIG. 8;

FIG. 10 is an elevation of the cutter of FIG. 8; and

FIG. 11 is an elevation of a knife used in the inventive cutter.

Figure 4:
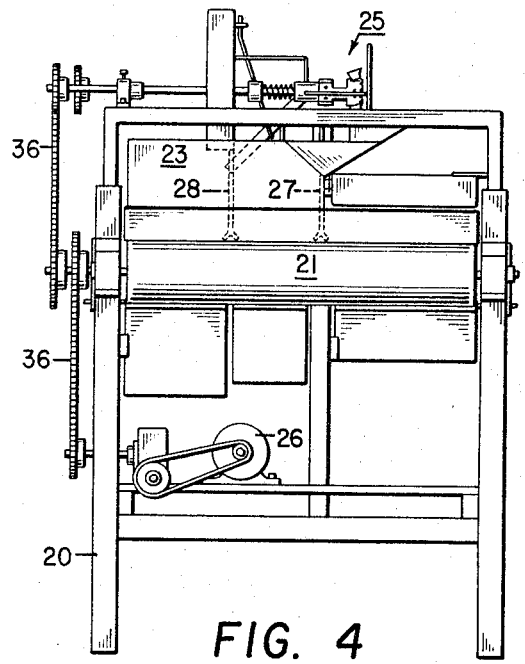
FIG. 4 is an elevation of the feed end of the machine of FIG. 1.

Throughout the drawings corresponding parts are identified by the same reference numerals. For purposes of illustration, the inventive trimmer is shown as a three station machine including a conveyor, but the invention can be embodied in a trimming machine having any desired number of stations, with or without conveyor. The illustrated machine in general will first be described, and then the structure and operation of the invention cutting head will be explained.

Referring to FIG. 1, the illustrated trimmer is arranged on a supporting framework 20 and includes a conveyor belt 21. Three cutting heads 25 are spaced along the machine to provide three trimming stations, the center one of which is shown in operation. Cabbages 22 are fed on to the receiving end of the illustrated machine, are guided by a receiving apron 23 to the operator's side of the machine, and are moved toward the operator. The operator presses the core end of each cabbage cutting head 25 for trimming away the coarse outer leaves, and the conveyor belt 21 carries away leaf and core trimmings to waste bin 24 and trimmed heads to a wrapping station not shown.

Figure 5:
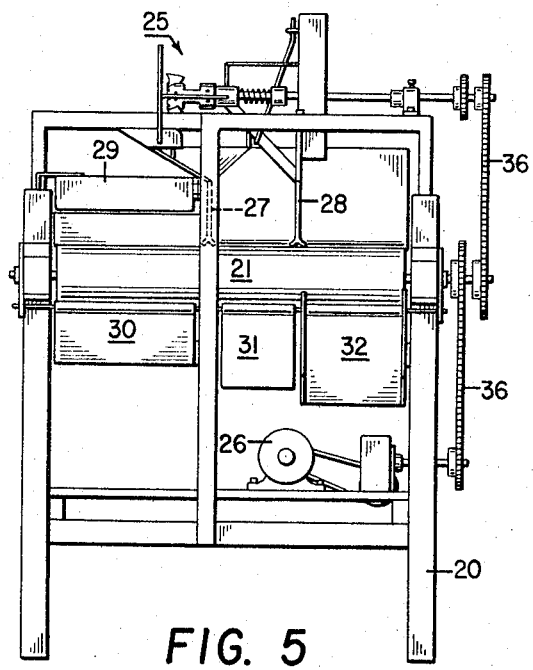
FIG. 5 is an elevation of the discharge end of the machine of FIG. 1.

As shown in FIGS. 4 and 5, an electric motor 26 is mounted on framework 20 and drives conveyor belt 21 and cutting heads 25 through an appropriate drive train 36 which may be gears, belts, chains, etc.

As shown in FIGS. 1–5 the upper surface of conveyor belt 21 is divided into three runs by two partitions 27 and 28. Partition 27 communicates with receiving apron 23 to guide untrimmed cabbages to the operator side of the machine, and partition 28 is spaced from and generally parallel with partition 27 for moving trimmed cabbages along the far side of the machine to a discharge apron 32. The conveyor runs on each side of partition 27, moves trimmings over aprons 30 and 31 into waste bin 24.

Gate 29 (FIG. 5) is preferably spaced above the upper surface of the conveyor belt 21 to keep untrimmed cabbages from falling over the delivery end of the machine, but to allow leaves and trimmings to be delivered over apron 30 into waste bin 24. Gate 29 is preferably movable so it can be raised to allow any accumulation or jam of trimmed leaves to pass over discharge apron 30.

As best shown in FIG. 2, platforms 33 are preferably arranged on the top of partition 27 as supports on which the operator can rest a cabbage while removing severed outer leaves. When all the trimmings are removed from the head, the operator places the trimmed head in one of the chutes 34 through which the head rolls over partition 28 and onto the far side of the conveyor belt 21 for delivery to cabbage discharge apron 32.

Of course, many different drive, conveyor, and delivery means other than the ones shown and described can be used within the spirit of the invention. In fact, a preferred embodiment of the invention, in addition to the one illustrated, comprises a powered cutting head 25 that is portable and adapted to be secured to the top of a container for receiving trimmings, and cabbages are picked up, pressed against the cutting head, trimmed, and passed on to another station by hand.

FIGS. 6–11 best show the details of cutting head 25. Shaft 37 is rotated by motor 26 and drive train 36 to power cutting head 25. Cutting head 25 is supported by mounting bracket 38 on which is mounted bearing 39 for shaft 37.

Figure 6:
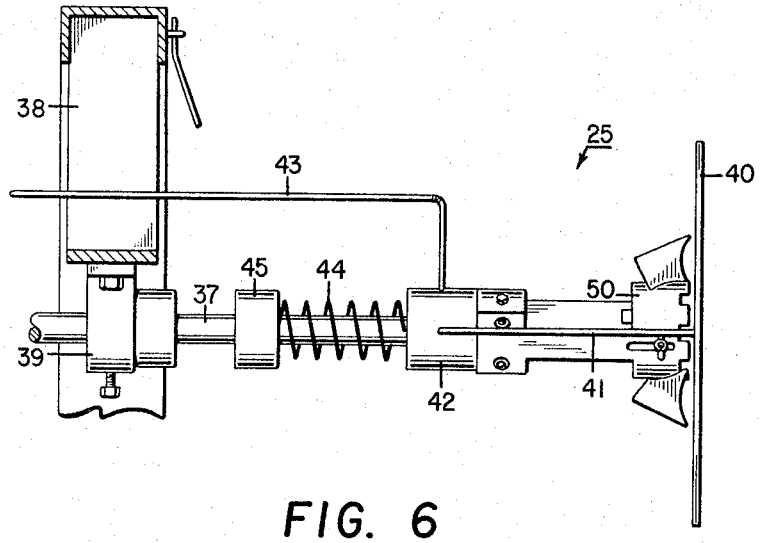
FIG. 6 shows a side elevation of the inventive cutting head taken along the line 6—6 in FIG. 2.

Guard 40 (also shown in FIG. 3) is preferably formed as a ring encircling cutting head 25. Guard mounting bracket 41 connects guard 40 to slidable sleeve 42 that is loosely mounted on shaft 37. Set rod 43 is secured to sleeve 42 and rests against mounting bracket 38 to prevent rotation of sleeve 42 or guard 40 as shaft 37 is rotated. Spring 44 encircles shaft 37 and is disposed in compression between boss 45 scured to shaft 37 and sleeve 42, to urge sleeve 42 and guard 40 toward the right as illustrated in FIGS. 6 and 7, to keep guard 40 normally in a guard position relative to the cutting head.

Pressing a cabbage against guard 40, pushes it to the left as illustrated in FIG. 7 to compress spring 44 and expose the core-end of the cabbage to the cutting head. Removal of a cabbage from the position illustrated in FIG. 7 allows guard 40 to be pushed back to its guard position by spring 44.

The inventive cutter is best shown in FIGS. 8–11. By means of sleeve 46 and set screw 47, cutter 50 is secured to shaft 37 for rotation therewith in the indicated direction. Extending forward of sleeve 46 on support legs 51, is a generally cylindrical bit 52 having sharpened spurs 53 on its forward edge and having a diameter a little larger than an average-sized cabbage core. Spurs 53 are adapted for cutting a circular path around the core of a cabbage to sever outer leaves from the core.

Within bit 52 is disposed a knife 54 having an upturned shapened edge 55 for cutting away the cabbage core within the circle cut made by spurs 53. Edge 55 of knife 54 is preferably adjustable relative to the cutting edge of spurs 53 by positioning knife 54 axially of cutter 50. This is accomplished by screws 56 extending through slots 58 and wing nuts 57. Such adjustment determines the amount of core left extending from the end of the trimmed cabbage after the coarse outer leaves are removed.

Arms 60 extend radially outward from bit 52 for loosening and removing the leaves that are severed from the core of a cabbage. Arms 60 rotate with bit 52 and are preferably shaped as illustrated for sliding under a severed leaf and tearing its cut end back away from the core.

*Operation*

Cabbages entering the receiving end of the inventive machine are deflected by apron 23 and partition 27 toward the operator side of the machine and are driven by conveyor belt 21 past the trimming stations. The operator picks up an untrimmed cabbage and presses it core-foremost against a driven cutting head 25. This pushes guard 40 back to expose the core-end of the cabbage to cutter 50. The spurs 53 on cutter 50 cut a circular path around the core of the cabbage and sever the outer leaves from the core. At the same time, knife 54 bores away the core to make it nearly flush with the trimmed end of the cabbage. Also, arms 60 catch and loosen or remove severed leaves from the head.

Leaves thus removed by cutting head 25 tumble down to conveyor 21 either into the channel between partitions 27 and 28 or into untrimmed cabbage channel and are discharged over aprons 30 and 31 into a waste bin. Any severed leaves not removed by arms 60 are picked off by the operator while the head is rested on platform 33.

When the head is satisfactorily trimmed, it is placed in chute 34 by the operator and rolls into the trimmed cabbage delivery channel of the conveyor 21 for delivery over apron 32.

The inventive trimmer allows an operator to cut and trim the outer leaves and excess core from a cabbage head nearly as rapidly as the heads can be picked up and pressed against the cutting heads. The invention thus greatly speeds up and reduces the cost of trimming cabbage heads for market and otherwise accomplishes its objects.

Other features, advantages, and other specific embodiments of this invention will be apparent to those exercising ordinary skill in the pertinent art after considering the foregoing disclosure. In this regard, while specific preferred embodiments of my invention have been described in considerable detail, such disclosure is intended as illustrative, rather than limiting, and other embodiments, variations, and modifications can be effected within the spirit and scope of the invention as disclosed and claimed.

I claim:

1. A cabbage trimmer comprising:
    (a) a rotatable cutter;
    (b) drive means for rotating said cutter;
    (c) said cutter comprising a spur revolved in a circular path for cutting around the core of a cabbage to sever outer leaves from said cabbage core, and means extending radially beyond said spur for loosening said leaves severed from said core.

2. The cabbage trimmer of claim 1 wherein said cutter comprises means for cutting away said core within said circular path of said spur.

3. The cabbage trimmer of claim 2 including movable guard means surrounding said cutter, a spring biasing said guard means toward a guard position, said guard means being arranged to be pushed back against said spring bias by movement of said cabbage against said guard to unguard said cutter and expose the core-end of said cabbage to said cutter.

4. The cabbage trimmer of claim 3 including conveyor means for bringing untrimmed cabbages to said cutter, and for carrying trimmed cabbage heads and severed leaves away from said cutter.

5. The cabbage trimmer of claim 4 wherein said drive means comprises an electric motor and drive train for connecting said motor to said cutter and to said conveyor means.

6. The cabbage trimmer of claim 1 wherein said cutter comprises a generally cylindrical hollow member having a diameter larger than the core of an average-sized cabbage, and said spur comprises a sharpened portion of the end edge of said cylindrical member.

7. The cabbage trimmer of claim 2 wherein said cutter comprises a generally cylindrical hollow member having a diameter larger than the core of an average-sized cabbage, said spur comprises a sharpened portion of the end edge of said cylindrical member, and said core cutting means comprises a knife mounted within said cylindrical member in the region of said spur edge.

8. The cabbage trimmer of claim 2 wherein said cutter comprises a generally cylindrical hollow member having a diameter larger than the core of an average-sized cabbage, said spur comprises a sharpened portion of the end edge of said cylindrical member, said core cutting means comprises a knife mounted within said cylindrical member in the region of said spur edge, and said leaf loosening means comprises an arm joined to said cylindrical member in the region of said spur edge and extending radially outward from said cylindrical member.

References Cited

UNITED STATES PATENTS

| | | | |
|---|---|---|---|
| 1,766,824 | 6/1930 | Jones | 146—52 |
| 2,204,846 | 6/1940 | Dotta | 146—81 |
| 2,716,480 | 8/1955 | Dotta | 146—81 X |
| 3,199,559 | 8/1965 | Csimma | 146—81 |

W. GRAYDON ABERCROMBIE, *Primary Examiner.*